Sept. 22, 1964 V. SHANOK ETAL 3,150,217
EXTRUSION METHOD AND APPARATUS
Filed March 14, 1960 2 Sheets-Sheet 1
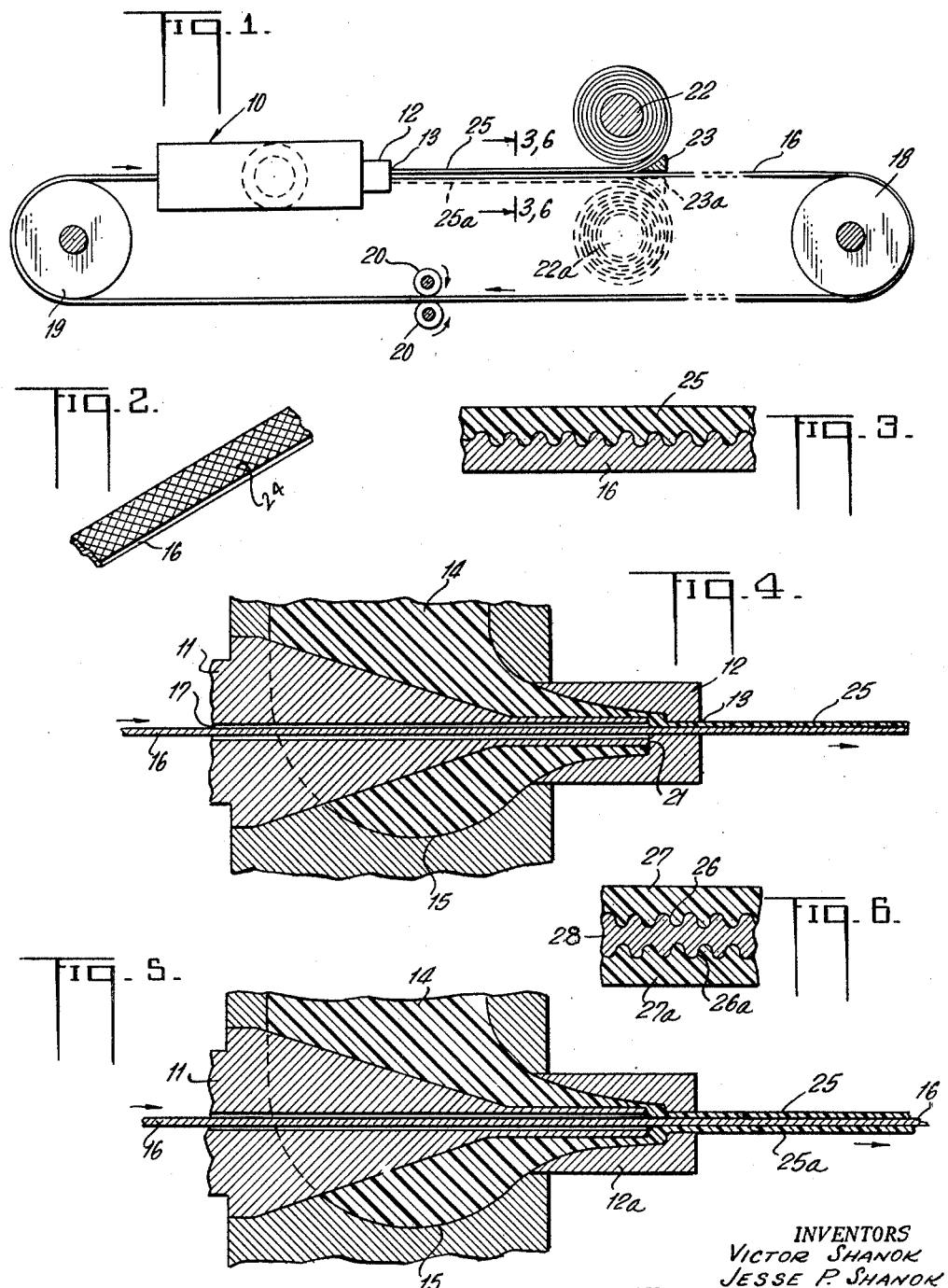
INVENTORS
VICTOR SHANOK
JESSE P. SHANOK
BY
ATTORNEY Sept. 22, 1964          V. SHANOK ETAL           3,150,217
                    EXTRUSION METHOD AND APPARATUS
Filed March 14, 1960                          2 Sheets-Sheet 2
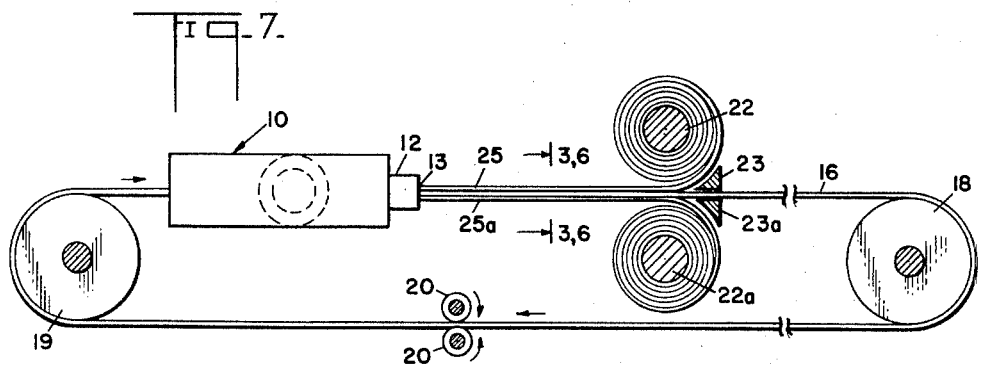
INVENTORS
VICTOR SHANOK
JESSE P. SHANOK
BY Friedman & Goodman
ATTORNEYS United States Patent Office 3,150,217
Patented Sept. 22, 1964

3,150,217
EXTRUSION METHOD AND APPARATUS
Victor Shanok and Jesse P. Shanok, both of 863 65th St., Brooklyn, N.Y.
Filed Mar. 14, 1960, Ser. No. 14,717
5 Claims. (Cl. 264—176)

This invention relates to an extrusion method and apparatus, and more particularly to an extrusion method adapted to produce extruded strip material at an accelerated rate and adapted to provide a varied surface configuration for the strip.

In the extrusion of thermoplastic materials, it has been found that the rate of extrusion of any strip is subjected to a number of limiting factors. Among these factors are the rheological characteristics of the thermoplastic material, particularly at the elevated temperatures required to express the required amounts of material at higher extrusion rates. In most thermoplastic materials, the elevation of the temperature of the material at the extrusion orifice and the acceleration of the flow thereof results in a loss of shape in the extruded strip, as well as the production of other undesired characteristics in the extrudate.

It is therefore an object of this invention to provide a method and arrangement for extruding thermoplastic materials at higher rates than have heretofore been achieved while maintaining the desired contours and configuration of the extruded strip.

It is also an object of this invention to provide a method as above indicated, wherein the extruded strip may have imparted thereto a surface pattern having components extending in a direction transverse of the axis of the strip, or a mirror-smooth finish.

Another object of this invention is to provide a method as heretofore indicated wherein a plurality of strips may be simultaneously extruded and said strips may, if desired, be formed with different surface characteristics.

It is an additional object of this invention to provide an apparatus for accomplishing the foregoing objects.

Other and further objects, benefits and advantages of this invention will become apparent from the description thereof contained in the annexed specification or will otherwise become obvious. It will be understood that the invention here disclosed may be employed for other purposes to which the structure and arrangement are adapted.

In the accompanying drawings:

FIGURE 1 is a diagrammatic view of an apparatus for practicing the method of this invention;

FIGURE 2 is a fragmentary perspective view of a form of carrier band for practicing the present invention;

FIGURE 3 is a section taken along line 3—3 of FIGURE 1 as it appears when a single strip is extruded on the carrier band shown in FIGURE 2 on an enlarged scale;

FIGURE 4 is a horizontal section of a cross-head arrangement for the extrusion of a single strip of thermoplastic material;

FIGURE 5 is a view similar to FIGURE 4 showing the cross-head arrangement for simultaneously extruding multiple strips;

FIGURE 6 is a section similar to FIGURE 3, showing a modified form of carrier band arrangement for dual strip extrusion; and FIGURE 7 is a view showing another form of apparatus for practicing the invention.

The instant extrustion method contemplates the extrusion of thermoplastic material by means of a conventional form of extrusion apparatus, preferably provided with a cross-head. In accordance with the present invention, the extruded material is applied to a travelling carrier band prior to its emergence from the extrusion die. The carrier band supports and draws the material out of the die until the stabilization of the configuration of the extruded strip, whereupon it is removed from the carrier band. It has been found that by this method the extrusion rate for any particular thermoplastic material and strip cross-section may be increased by a factor of from 3 to 10 over the rate of extrusion of the same material in the same configuration by conventional methods. It has further been found that the thermoplastic material may be extruded at considerably higher temperatures and at lower viscosities in order to accomplish higher extrusion rates without the loss of the desired dimensional and surface characteristics.

Referring more particularly to the drawings, FIGURES 1 and 4 illustrate an extrusion cross-head, designated generally by the numeral 10, which may be of conventional type and is carried by a conventional form of plastic extruder apparatus not shown. The extrusion cross-head 10 is advantageously provided with a guider tube 11 and an extrusion die 12 having an extrusion orifice 13. The thermoplastic material 14 is forced into the cavity 15 of the extrusion cross-head wherein it is caused to fill the cavity and flow along the outer surfaces of the guider tube 11 and through the orifice 13 of the die 12. The carrier band 16 passes through the axial bore 17 of the guider tube and emerges through the die orifice 13. The carrier band 16 is transported through the cross-head and travels with the extruded plastic material. In the form of carrier band illustrated in FIGURE 1, said band comprises an endless band of flexible metal, such as stainless steel for example. The band passes through the extrusion cross-head and around idler wheels 18 and 19. In order to impart motion to the band and to transport it through the cross-head, a pair of drive wheels 20 are provided between which the band is gripped. The wheels are driven by a source of motor power not shown to transport the band at a linear speed corresponding to the desired extrusion.

It will be apparent from the foregoing that there is thus provided an extrusion cross-head through which a continuous supporting or carrier band is moved and that the thermoplastic material is contacted with and deposited upon the surface of said carrier band immediately prior to its passage through the extrusion orifice and emerges from the die in that condition.

In the embodiment of the invention illustrated in FIGURE 4, the thermoplastic material is applied to the upper surface of the carrier band only. The deposition of material on the lower surface of said band is restricted by the abutment of the lower portion of the tip of the guider tube with the inner die face, as indicated at 21. The proximity of the lower wall of the die orifice to the undersurface of the band as it passes therethrough, also serves to prevent the deposition of plastic material thereon. As a consequence of this arrangement, a strip of thermoplastic material 25 is deposited upon the carrier band as it emerges from the extrusion orifice and remains in contact with said band and is supported thereby until it has sufficiently hardened or been stabilized to permit it to be stripped therefrom, as by means of the wind-up reel 22 and stripping knife 23. If desired, cooling means such as an air or water stream, or both, not shown, may be utilized to assist in the more rapid stabilization of the strip, such means being interposed between the die opening and the wind-up reel. The continuous carrier band is caused to travel at the same rate as the desired extrusion rate of the thermoplastic material. It has been found that by means of this arrangement, the extrusion rate of the thermoplastic material can be materially increased by the factors heretofore indicated and that material increase in extrusion rate can be accomplished at otherwise conventional extrusion temperatures and conditions. Elevated extrusion temperatures can be readily tolerated and taken advantage of for even greater increase in the extrusion rate.

A further advantage of this arrangement resides in the fact that the carrier band may be planar, or it may be provided with surface indentations or embossments corresponding to a desired surface pattern and that the extruded strip will consequently be provided with a surface of a complementary configuration. An additional distinct advantage of the instant extrusion method resides in the fact that extruded strips having mirror-smooth surfaces may be produced. Thus, if the surface of the band is highly polished, it will be reproduced on the surface of the extrusion. Furthermore, the instant arrangement permits the production of extrusions held to close dimensional tolerances. Dimensional variations along the length of the strip may be minimized. Thus, as may be seen from FIGURES 2 and 3, the face of the band 16 may be provided with a zigzag pattern 24 having components transverse to the axis of the extrusion and the extruded strip 25 will be provided with the complementary configuration. FIGURE 5 illustrates a modified form of arrangement wherein the entire terminal portion of the guider tube is spaced from the opening of extrusion die 12a and the thermoplastic material is simultaneously applied to both the upper and lower surfaces of the carrier band. The extrusion of the additional strip is indicated in FIGURE 1 by means of broken lines. Under these conditions, the lower extruded strip 25a is stripped from the lower surface of the carrier band by means of an additional wind-up reel 22a and stripping knife 23a in the same manner as with respect to the upper strip 25. When dual strips are extruded in the manner indicated, the embossments on the surface of the carrier band may, if desired, be provided on both planar surfaces, as indicated in FIGURE 6, on an enlarged scale. In this form, the modified carrier band 28 is provided with embossments on its upper and lower surfaces 26 and 26a respectively, forming complementary three-dimensional surfaces on the strips 27 and 27a respectively.

The removal of the extruded strips from the carrier band may be accomplished by other suitable means and is facilitated when the side edges of the band are kept free of the plastic material. This may be accomplished by providing a close fit between the side edges of the carrier band and the side walls of the extrusion orifice. However, the complete absence of plastic material from the side edges is not essential and if a certain amount of plastic material extends around said side edges, it will be found that such material is split apart as the body of the plastic strip is separated from the carrier band. Although the invention has been described with reference to the use of a continuous carrier band, it will be understood that some of the advantages of this invention may be achieved by the use of an elongated band which is drawn through the extrusion cross-head at the desired rate of speed.

While we have here shown and described a preferred embodiment of our invention, it will be apparent however that this invention is not limited to this embodiment and that many changes, additions and modifications can be made in connection therewith without departing from the spirit and scope of the invention as herein disclosed and hereinafter claimed.

Having described our invention what we claim as new and desire to secure by Letters Patent is:

1. The method of extruding thermoplastic strip material which comprises expressing said material through an extrusion orifice of a cross-head and simultaneously depositing said material upon both surfaces of a carrier band prior to its emergence from said orifice, stabilizing said material on said carrier band and stripping said material in stabilized form therefrom.

2. In an extrusion apparatus for forming thermoplastic strip material including an extrusion cross-head provided with a guider tube and an extrusion die having an extrusion orifice, means for supporting said material while in thermoplastic state as it passes through said orifice, said means comprising a carrier band having a portion thereof disposed in said guider tube and passing through said orifice, means for moving said band through said guider tube and said orifice in the direction of said extrusion and means for removing said strip from said band upon the stabilization of the thermoplastic material forming said strip.

3. Apparatus according to claim 2, wherein said band is of substantially the same width as said extrusion orifice.

4. Apparatus according to claim 2, wherein said band comprises an endless loop of metal.

5. Apparatus according to claim 2, wherein said carrier band is provided with an embossed surface.

References Cited in the file of this patent

UNITED STATES PATENTS

| 429,255 | Bishop | June 3, 1890 |
|---|---|---|
| 1,812,686 | Crowdes | June 30, 1931 |
| 2,047,395 | Stelkens | July 14, 1936 |
| 2,096,347 | Short | Oct. 19, 1937 |
| 2,251,047 | Gangloff | July 29, 1941 |
| 2,756,459 | Kellner | July 31, 1956 |

FOREIGN PATENTS

| 624,494 | Germany | Jan. 2, 1936 |
|---|---|---|
| 1,078,952 | France | Nov. 24, 1954 |